3,274,253
AMMONOLYSIS PROCESS
Kenneth H. Markiewitz, Wilmington, Del., assignor to Atlas Chemical Industries, Inc., Wilmington, Del., a corporation of Delaware
No Drawing. Filed July 18, 1963, Ser. No. 296,103
3 Claims. (Cl. 260—585)

This invention relates to the ammonolysis of alcohols and more particularly to an improved process for obtaining primary alkyl amines by the liquid phase ammonolysis of alcohols.

It is well known in the art that primary and secondary alcohols can be converted to amines by reaction with ammonia in the presence of catalysts, particularly in the presence of hydrogenation catalysts such, for example, as Raney nickel. All of the hydrogen atoms of the ammonia are potentially replaceable by the alkyl radical of the reacting alcohol so that the reaction product is a mixture of primary, secondary and tertiary amines. Recovery of primary amine from the mixed product can be readily effected by fractional distillation when the compounds involved are of low molecular weight but when alcohols of higher molecular weight are aminated resolution of the reaction product mixture into its component parts is impracticable. In order to obtain reaction products high in primary amine content from such alcohols it is essential to effect the amination under conditions such that the formation of secondary and tertiary amines is suppressed. Similarly, when it is desired to prepare monomeric amines from dihydric or polyhydric alcohols it is essential to suppress secondary and tertiary amine formation since these lead to the production of polymers. The formation of secondary and tertiary amines may be suppressed to some extent by carrying out the reaction in the presence of a very large excess of ammonia. The use of large excesses of ammonia objectionably increases the pressure under which the reaction must be carried out.

In accordance with the present invention the process for the catalytic ammonolysis of alcohols is modified to increase the proportion of primary amine in the product without employing excessive amounts of ammonia. The said modification comprises the introduction of a co-catalyst along with the usual catalyst of the hydrogenation type, which co-catalyst is a member of the group consisting of alkali metal hydroxides, weak acid salts of alkali metal hydroxides, and aluminum alkoxides. Among such catalysts may be named the carbonates, bicarbonates, triphosphates, aluminates and alcoholates of sodium and of potassium, and aluminum isopropoxide.

The process is applicable to the reaction of ammonia with any alcohol which undergoes ammonolysis reaction in the presence of hydrogenating catalyst. These include the primary and secondary alkanols having at least 2 carbon atoms, glycols in which the hydroxyl groups are separated by at least 6 atoms, such as triethylene glycol, or 1,6-hexane diol; benzyl alcohol, polyglycol ethers of alcohols, amines or phenols, etc.

The effectiveness of the co-catalysts to increase the proportion of primary amine in the ammonolysis is shown in the numbered illustrative examples below which may be compared with Example A showing the product distribution to be expected under comparable conditions in the absence of the co-catalyst. In all of the examples a 1-gallon stainless-steel stirred autoclave was charged with 800 ml. n-butanol, 220 grams liquid ammonia, 20 cc. of a Raney nickel slurry in butanol and the amount of co-catalyst indicated in the table below. The reaction mixture was heated for 3 hours at 250° C., cooled, siphoned out of the autoclave and filtered to remove catalyst. The filtrate was fractionally distilled and the distillate analyzed. Pertinent data are presented in tabular form.

| Example | A | 1 | 2 | 3 | 4 |
|---|---|---|---|---|---|
| Co-Catalyst | None | NaOH | $NaHCO_3$ | $Na_3PO_4$ ($12H_2O$) | Al isopropoxide |
| Wt. co-catalyst (grams) | | 1.0 | 20 | 46.5 | 30 |
| Max. Pressure Developed, #/in.² | 1,650 | 2,000 | 2,250 | 1,670 | 1,770 |
| Butanol Unreacted (percent of charged butanol) | 14.1 | 18.1 | 9.0 | 11.5 | 16 |
| Amine Distribution: Percent Primary | 75.5 | 94 | 92 | 84 | 86 |
| Percent Secondary | 24.5 | 6 | 8 | 16 | 14 |

The examples amply illustrate how the co-catalysts of the invention favor the production of primary amines at the expense of secondary. Thus the approximately 3:1 ratio of primary to secondary amine in the control example is increased to as much as 16 to 1 when employing a co-catalyst in accordance with the invention.

Similar results to those shown in the detailed examples are obtained when the corresponding potassium compounds are substituted for the sodium compounds. Moreover, the above-described alkaline reacting co-catalysts are effective to favor primary amine formation when employing hydrogenation catalysts other than Raney nickel, such for example, as nickel supported on kieselguhr or a noble metal catalyst.

The proportion of the added co-catalyst may vary over a considerable range, amounts to furnish from 1 to 100 milliequivalents thereof per mol of charged alcohol being suitable.

What is claimed is:
1. In the catalytic ammonolysis of aliphatic alcohols, which undergo ammonolysis reaction in the presence of hydrogenating catalyst, with ammonia in liquid phase to yield predominantly primary amines the improvement which comprises adding to the reaction system a minor proportion of a compound selected from the group consisting of alkali metal hydroxides, weak acid salts of alkali metal hydroxides and aluminum alkoxides.
2. The process of claim 1 wherein the said compound is sodium hydroxide.
3. In the preparation of a primary amine by the reaction of ammonia with an aliphatic alcohol, which undergo ammonolysis reaction, in liquid phase and in the presence of a hydrogenation catalyst the improvement which comprises adding to the reaction system a minor proportion of an alkaline reacting compound of an alkali metal.

References Cited by the Examiner
UNITED STATES PATENTS
2,636,902    4/1953    Taylor et al. _____ 260—585

CHARLES B. PARKER, *Primary Examiner.*

A. H. SUTTO, R. L. RAYMOND, *Asssitant Examiners.*